Patented July 15, 1952

2,603,609

UNITED STATES PATENT OFFICE 2,603,609

BINDING BAUXITE FINES INTO GRANULES WITH COLLOIDAL SILICA

Heinz Heinemann, Drexel Hill, Pa., assignor to Porocel Corporation, Philadelphia, Pa., a corporation of Delaware No Drawing. Application April 26, 1949,
Serial No. 89,814

6 Claims. (Cl. 252—451)

The present invention relates to a method of producing bauxite granules from bauxite fines, which granules have a surface area and hardness equal or superior to that of bauxite granules produced by conventional methods.

Bauxite, which is a naturally occurring alumina ore containing some clay, iron, and titania, finds use in a variety of treatments or reactions as an adsorbent, catalyst, and catalyst carrier. In order to produce the granular grades currently marketed, the ore containing 40% to 45% volatile matter (mostly water) is usually dried to about 30% volatile matter, crushed, screened and thermally activated by heating at 600° F. to 1200° F. to leave in the granules a volatile content between 1% and 10% by weight. In the course of grinding or milling, some breakdown to fine powder occurs. For example, the smallest mesh size granular bauxite usually marketed is 40-80, and any bauxite particles finer than 80 mesh are considered as "fines." This material is too fine to find use in stationary bed applications such as mineral oil or wax decolorization, or hydrocarbon desulfurization and isomerization, and many attempts have been made to form it into granular particles by chemical or physical means. Most of these attempts have failed either because of the detrimental effect of the chemicals added on the adsorbent and catalytic properties of the bauxite or because the resulting granules were too soft and disintegrated readily. Granulating bauxite fines by means of sodium silicate followed by acid washing has been suggested, but this method is cumbersome, requires considerable equipment and control, and is expensive. Granulating fines by adding sodium silicate and baking gives a product of poor adsorbent properties due to the presence of sodium ions which are not readily removed. Attempts to granulate fines simply by moistening with water or organic binders and then subjecting the mixture to compression, pelleting, or extrusion yields a product which is only surface hardened and which disintegrates when its outer surface is cracked or abraded.

I have now found a method for producing bauxite granules from bauxite fines which avoids the difficulties of the prior art processes, and which gives hard, resistant granules without loss of surface or porous properties.

In accordance with my invention, bauxite fines which have been thermally activated at 600° F. to 1200° F. are impregnated with an aqueous solution of colloidal silica having a concentration between 2% and 30% in an amount sufficient to give between 2% and 20%, and preferably 5% and 15% by weight, of silica in the bauxite fines. The fines employed in this invention constitute bauxite having a mesh size of 80 or smaller, and include material which will pass a 100, or a 200, or even a 300 mesh screen. These bauxite fines may be soaked in an excess of the colloidal silica solution, or may be mixed with such an amount of solution as will leave the fines in a moist condition. When an excess of solution is used, that which is not soaked up or absorbed may be drained off for reuse. In any event, it is desirable to produce a mixture of bauxite fines containing the required amount of silica and a volatile matter content (mostly water) ranging between 30% and 40% by weight, and preferably 35% to 40%. A volatile matter content between 30% and 40% is necessary in order to carry out a subsequent process step, i. e., the forming of the fines into pellets or masses. The proper volatile content may be obtained by adjusting the quantity and concentration of the colloidal silica solution so that upon mixing with the fines, the desired volatile content is achieved. Alternatively, the fines may be impregnated with a fairly concentrated colloidal silica solution, and then sufficient water is added to give the desired volatile content.

The fines thus impregnated with colloidal silica solution are then shaped into sizable masses by compression, tabletting, or pelleting, or by extrusion through a die plate provided with a plurality of small apertures, the pressure employed in any of these shaping methods ranging between 100 and 3000 lbs./sq. in. The bauxite fines may be shaped into granules of final desired size directly by employing tabletting, pelleting, or extrusion apparatus having dies of the required dimensions, for example, cylindrical or rounded pellets of ⅛, 3/16, or ¼ inch diameter, or alternatively, the fines containing the colloidal silica solution may be formed into larger masses using the same type of equipment but with larger dies such as to give pellets of ½ to 1½ inches in diameter.

After shaping, the masse may be dried at 180° F. to 220° F. or at temperatures as high as 300° F. or 400° F. to irreversibly precipitate the silica and thus bond the fines. The dried masses are then thermally activated by heating at 600° F. to 1200° F., and thereafter, if necessary, reduced to granules of required mesh size by grinding and screening. For example, the granules may be produced in mesh sizes of 2/4, 4/8, 4/10, 4/14, 8/14, 10/30, 20/60, or 40/80. These granules are strong, uniform units which resemble natural bauxite granules produced by conventional methods from raw bauxite ore, and can be used in deep beds without undue break-down and attrition. The physical properties of the granules produced from the fines, such as surface area, pore size, pore diameter, adsorbent power, etc., are the same as those of natural bauxite granules, and in many cases the surface area may be slightly larger. Adsorbent and catalytic properties, as well as the ability to function as catalyst carriers or supports, are unimpaired or improved.

The mixing or impregnation of the bauxite fines with the colloidal silica solution may be carried out in any suitable apparatus, for example, a plug mill or vessel preferably provided with a stirring means. After mixing or impregnation is accomplished, the moist fines are delivered to the shaping apparatus such as a conventional auger extrusion machine provided with an apertured die plate, and the moist fines are extruded in the form of a plurality of cylindrical rods which are cut or broken into lengths as they issue from the die apertures. For successful extrusion, the volatile matter content (water) should be maintained between 35% and 40%, otherwise the extrusion to produce fairly rigid masses is difficult to accomplish. In the event that the masses or pellets are formed in a hydraulic press, tabletting or pelleting machine, the volatile matter content of the fines should be held within the range of 30% to 40% by weight. Drying of the masses may be effected in conventional drying equipment and calcination may be carried out in rotary kilns or other types of burners.

The aqueous solution of colloidal silica to be employed in accordance with this invention should contain silica having an average particle size between 100 and 600 Å. (angstrom units), and should have a pH between 9.5 and 10.5. Such colloidal solution is neither a true solution of silica nor a solution of sodium silicate, and is not to be confused therewith.

A commercially available colloidal silica solution which may be used in accordance with this invention has the following properties:

| | |
|---|---|
| $SiO_2$ | 29%–31% |
| $Na_2O$ | 0.31%–0.41% |
| Sulfates (as $Na_2SO_4$) | 0.15% |
| pH | 9.5–10.5 |
| Gravity ° Baumé | 24.7–26.4 |
| Viscosity @ 25° C. | 2.0–3.3 |
| Freezing point | 32° F. |
| $SiO_2$ (average particle size) | 100–600 Å. |

Such colloidal silica solution may be diluted with water without affecting its stability. Cooling the solution to 32° F. or lower causes the silica to be irreversibly precipitated, as does evaporating the water from the solution by heating, preferably at 180° F. or higher. The $Na_2O$ content serves only to stabilize the colloidal $SiO_2$ and is not essential except to maintain stability prior to use. Such $Na_2O$ does constitute sodium silicate, and insofar as this invention is concerned, is without effect.

The present invention may be further illustrated by the following example, which, however, is not to be construed as limiting the scope thereof.

200 grams of bauxite fines produced as a by-product in the commercial operation of a plant for manufacturing natural bauxite granules, which fines had been activated at about 1100° F. during plant processing, were wetted with 130 cc. of colloidal silica solution. Such solution was obtained by diluting the above described commercially available colloidal silica solution with water to give 18% by weight $SiO_2$ concentration. The fines and solution were thoroughly mixed, and the mixture was compressed in a hydraulic press at 2,000 lbs./sq. in. to give masses or pellets 1⅛″ in diameter by 1″ in length. These pellets were dried at 180° F. to 220° F. and then calcined at 1100° F. to a volatile matter content of 0.7%, cooled, crushed, and screened to 2/4 mesh granules. These granules, as well as similar mesh size granules from natural bauxite likewise calcined at 1100° F., were subjected to a hardness or break-down test which comprises tumbling the granules in a metal cylinder 10 inches in length and 4 inches in diameter rotated at 19 R. P. M. for one hour, and then screening to determine the amount of break-down. The results are presented in the following table and the notations "T/4, T/8, and T/20" define the percentage of bauxite passing through a 4 mesh screen, an 8 mesh screen, and a 20 mesh screen, respectively. The smaller the percentage, the less the break-down of the granules.

| | Break-Down | |
|---|---|---|
| Weight percent | Granules from fines | Granules from natural bauxite |
| T/4 | 6.5 | 10.7 |
| T/8 | 3.2 | 5.9 |
| T/20 | 2.9 | 3.4 |

From this data it will be seen that the granules produced by binding bauxite fines with colloidal silica were more resistant to breakdown than those obtained in the conventional production of granules from natural ore. Moreover, the granules produced from fines have at least equal or greater surface area than natural granules, and are capable of retaining their strength even after impregnation with various catalysts such as metals, their oxides, or their salts.

I claim:

1. A method for producing bauxite granules from bauxite fines, which comprises mixing with bauxite fines a colloidal solution of silica having an average particle size between 100 and 600 Å. and a pH between 9.5 and 10.5 in an amount sufficient to give between 2% and 20% of silica in the bauxite fines, forming the silica-impregnated fines into masses under a pressure between 100 and 3000 lbs./sq. in., drying the masses, and calcining the dried masses at 600° F. to 1200° F.

2. A method for producing bauxite granules from bauxite fines, which comprises mixing with bauxite fines a colloidal solution of silica having an average particle size between 100 and 600 Å. and a pH between 9.5 and 10.5 in an amount sufficient to give between 2% and 20% of silica in the bauxite fines, forming the silica-impregnated fines into masses under a pressure between 100 and 3000 lbs./sq. in., drying the masses, calcining the dried masses at 600° F. to 1200° F., and reducing the calcined masses to granules.

3. A method of producing bauxite granules from bauxite fines, which comprises mixing with bauxite fines a colloidal solution of silica having an average particle size between 100 and 600 Å. and a pH between 9.5 and 10.5 in an amount sufficient to give between 5% and 15% of silica in the bauxite fines, adjusting the water content of the silica-impregnated fines to a value between 35% and 40% by weight, extruding the mixture at a pressure between 100 and 3000 lbs./sq. in., drying the extrudate, and calcining the dried material at 600° F. to 1200° F.

4. A method of producing bauxite granules from bauxite fines, which comprises mixing with bauxite fines a colloidal solution of silica having an average particle size between 100 and 600 Å. and a pH between 9.5 and 10.5 in an amount sufficient to give between 5% and 15% of silica in the bauxite fines, adjusting the water content of the silica-impregnated fines to a value between 35% and 40% by weight, extruding the mixture at a pressure between 100 and 3000 lbs./sq. in., drying the extrudate, calcining the dried material at 600° F. to 1200° F., and reducing the calcined material to granules.

5. A method for producing bauxite granules from bauxite fines, which comprises mixing with bauxite fines a colloidal solution of silica having an average particle size between 100 and 600 Å. and a pH between 9.5 and 10.5 in an amount sufficient to give between 5% and 15% of silica in the bauxite fines and of a concentration such as to give between 35% and 40% by weight of water in the bauxite fines, extruding the mixture at a pressure between 100 and 3000 lbs./sq. in., drying the extrudate, and calcining the dried material at 600° F. to 1200° F.

6. A method for producing bauxite granules from bauxite fines, which comprises mixing with bauxite fines a colloidal solution of silica having an average particle size between 100 and 600 Å. and a pH between 9.5 and 10.5 in an amount sufficient to give between 5% and 15% of silica in the bauxite fines and of a concentration such as to give between 35% and 40% by weight of water in the bauxite fines, extruding the mixture at a pressure between 100 and 3000 lbs./sq. in., drying the extrudate, calcining the dried material at 600° F. to 1200° F., and reducing the calcined material to granules.

HEINZ HEINEMANN.

REFERENCES CITED

The following references are of record in the file of this patent:

UNITED STATES PATENTS

| Number | Name | Date |
|---|---|---|
| 2,292,632 | Greger | Aug. 11, 1942 |
| 2,383,653 | Kirk | Aug. 28, 1945 |
| 2,391,116 | Ashley | Dec. 18, 1945 |
| 2,394,515 | Gosborn | Feb. 5, 1946 |
| 2,454,942 | Pierce et al. | Nov. 30, 1948 |
| 2,574,902 | Bechtold et al. | Nov. 13, 1951 |